UNITED STATES PATENT OFFICE.

ALEXANDER Y. ROZENBURY, OF WATERLOO, INDIANA.

IMPROVEMENT IN COMPOSITIONS FOR STUPEFYING BEES.

Specification forming part of Letters Patent No. 115,107, dated May 23, 1871.

*To all whom it may concern:*

Be it known that I, ALEXANDER Y. ROZENBURY, of Waterloo, De Kalb county, in the State of Indiana, have invented a new, useful, and Improved Composition or Opiate for Stupefying Bees; and I hereby declare the following to be a full and exact description thereof.

The nature or essence of my invention consists in the composition or opiate for stupefying bees described in the following specification.

To enable others skilled in making compositions to make and use my invention, I will proceed to name the several ingredients and describe the mode of mixing them.

I put into a bottle or jug that will hold one gallon, half a gill of the oil of anise, half a gill of the oil of peppermint, seven-eighths of a quart of alcohol, and mix them well together, and then add two quarts of water and one table-spoonful of white sugar, and mix the whole thoroughly together.

To use this compound, put fifteen or twenty drops upon some rotten wood or other material that will burn and make a smoke, and set it on fire and blow the smoke into the hive, which will stupefy the bees so that they may be removed or their comb taken out of the hive without the danger of being stung by the bees and without injuring the bees, as they will revive again on being exposed to fresh air or by blowing air into the hive.

Having described my new composition or opiate for stupefying bees, and the mode of compounding and using it, I claim as my invention—

The above-described composition or opiate for stupefying bees, compounded in about the proportions specified.

A. Y. ROZENBURY.

Witnesses:
   JAS. S. BEST,
   AMOS HALE.